United States Patent
Wu

(10) Patent No.: US 9,704,686 B2
(45) Date of Patent: Jul. 11, 2017

(54) ELECTRIC ALIGNMENT DEVICE AND ALIGNMENT METHOD FOR A BIREFRINGENCE GRATING

(71) Applicant: BOE Technology Group Co., Ltd., Beijing (CN)

(72) Inventor: Yanbing Wu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 38 days.

(21) Appl. No.: 13/985,159

(22) PCT Filed: Feb. 21, 2013

(86) PCT No.: PCT/CN2013/071745
§ 371 (c)(1),
(2) Date: Aug. 13, 2013

(87) PCT Pub. No.: WO2013/159589
PCT Pub. Date: Oct. 31, 2013

(65) Prior Publication Data
US 2014/0073214 A1    Mar. 13, 2014

(30) Foreign Application Priority Data

Apr. 26, 2012    (CN) .......................... 2012 2 0186622

(51) Int. Cl.
*H01J 9/20* (2006.01)
*G02B 26/08* (2006.01)
(Continued)

(52) U.S. Cl.
CPC .............. *H01J 9/205* (2013.01); *G02B 26/08* (2013.01); *G02B 27/286* (2013.01);
(Continued)

(58) Field of Classification Search
USPC .......................................................... 349/201
See application file for complete search history.

(56) References Cited

U.S. PATENT DOCUMENTS 5,844,644 A * 12/1998 Oh .................... G02F 1/134363
                                                           349/141
6,580,674 B1 * 6/2003 Nishiyama ........... G02B 5/3083
                                                           369/112.01
(Continued)

FOREIGN PATENT DOCUMENTS

CN        1211022 A      3/1999
CN      101349770 A      1/2009
(Continued)

OTHER PUBLICATIONS

International Search Report for PCT/CN2013/071745 Dated May 23, 2013, 11 pgs.
(Continued)

*Primary Examiner* — Lauren Nguyen
(74) *Attorney, Agent, or Firm* — Ladas & Parry LLP

(57) ABSTRACT

An electric alignment device and an alignment method for a birefringence grating are disclosed in the embodiments of the present invention. The electric alignment device comprises: an alignment platform provided with at least two stripe electrodes, the at least two stripe electrodes are parallel to each other so as to generate an electric field for aligning liquid crystal polymer in the birefringence grating.

20 Claims, 3 Drawing Sheets

(51) Int. Cl.
G02B 27/28 (2006.01)
G02F 1/1335 (2006.01)
G02F 1/1347 (2006.01)
G02F 1/29 (2006.01)

(52) U.S. Cl.
CPC .... *G02F 1/13471* (2013.01); *G02F 1/133526* (2013.01); *G02F 2001/294* (2013.01)

(56) References Cited

U.S. PATENT DOCUMENTS

2006/0098296 A1* 5/2006 Woodgate et al. ........... 359/642
2011/0102711 A1* 5/2011 Sutherland et al. ............ 349/86

FOREIGN PATENT DOCUMENTS

CN 202548357 U 4/2012
EP 1164411 A1 12/2001

OTHER PUBLICATIONS

International Preliminary Report on Patentability issued by the International Bureau of WIPO on Oct. 28, 2014 for International Application No. PCT/CN2013/071745, 10 pages.

* cited by examiner

ELECTRIC ALIGNMENT DEVICE AND ALIGNMENT METHOD FOR A BIREFRINGENCE GRATING

CROSS REFERENCE TO RELATED APPLICATIONS

This application is based on International Application No. PCT/CN2013/071745 filed on Feb. 21, 2013, which claims priority to Chinese National Application No. 201220186622.4, filed on Apr. 26, 2012, the contents of which are incorporated herein by reference.

TECHNICAL FIELD

Embodiments of the present invention relate to a three dimensional (3D) display technology, and particularly relate to an electric alignment device and an alignment method for a birefringence grating.

BACKGROUND

With the development of display technologies and requirement of better display effect, 3D display technology has attracted broad attention. The hypostasis of 3D display is to produce a stereoscopic effect by a binocular parallax, i.e., a left-eye picture is seen by the left eye of a person, and a right-eye picture is seen by his/her right eye. When the left-eye and right-eye pictures become a pair of stereoscopic images having the parallax, both of these two images will be combined in the brain to generate the 3D effect.

In the prior 3D technology, birefringence grating 3D technology is particularly desirable, because it has an advantage of high brightness and can be used to achieve a 2D/3D switch. As shown in FIGS. 1a-1b, a birefringence grating display device comprises: a display unit 1, a switching device 2 and a birefringence grating 3. The display unit 1 may be a display device, such as a liquid crystal display, an electroluminescence device (EL), or a plasma display panel (PDP). In the display device such as EL and PDP, a polarizing device by which light emitted from the display can be converted into polarized light should be added to the display device. The switching device 2 comprises: an upper substrate, a lower substrate, a first alignment layer and an upper electrode formed on the upper substrate, a second alignment layer and a lower electrode formed on the lower substrate, and liquid crystal molecules encapsulated between the first alignment layer and the second alignment layer. Through the switching device, the light emitted from the display unit 1 can be rotated by 90° or be transmitted without any rotation. As shown in FIGS. 2a-2c, the birefringence grating comprises: a concave grating 3-1 (that can be a concave lens array including a plurality of concave lenses), a substrate 3-2 assembled with the concave grating 3-1 (the alignment layer is formed on a surface of the substrate 3-2), a plurality of aligned and cured liquid crystal molecules 3-3 filled between the concave grating 3-1 and the substrate 3-2. The refractive index of the liquid crystal molecules along a short axis is matched with the refractive index of the concave grating 3-1, such that when the light emitted from the switching device 2 is transmitted through the concave grating 3-1 and the substrate 3-2 in a polarizing direction vertical to a drawing sheet, the light will not be deflected because the two structure have the same refractive index. In this case, the display device presents a 2D display mode (as shown in FIG. 1b). The refractive index of the liquid crystal molecules 3-3 along a long axis is different from the refractive index of the concave grating 3-1. When the light emitted from the switching device 2 is transmitted through the concave grating 3-1 and the substrate 3-2 in a horizontal direction, due to the difference between the refractive index of the liquid crystal molecules 3-3 and that of the concave grating 3-1, the direction of emission light can be deflected like passing through a convex lens, and the display effect as achieved by combined lens can be obtained. In this case, the display device presents a 3D display mode (as shown in FIG. 1a).

The traditional method of manufacturing the birefringence grating comprises following steps: firstly, forming a concave grating and performing a rubbing alignment, or forming a concave grating, coating an alignment film, and performing a rubbing alignment or optical alignment; secondly, providing an substrate on which an alignment film is coated; finally, arranging the concave grating and the substrate opposed to each other, filling liquid crystal polymer therebetween, performing alignment on the polymer and curing. As a result, the birefringence grating is obtained.

However, one disadvantage of this method is related to the alignment of the liquid crystal polymer. On the one hand, because the inner surface of the concave grating is domelike, it is difficult to rub all the inner surface and to rub uniformly as well; on the other hand, the height of the domelike concave lens is about 50-500 μm, thus the alignment of the liquid crystal molecules in the center portion of the concave lens can not be aligned perfectly. This poor alignment is the most important problem in the birefringence grating of the 3D display technology.

SUMMARY

An object of the present invention is to provide an electric alignment device and alignment method which can achieve a better alignment effect of the liquid crystal polymer in birefringence grating.

According to an aspect of the invention, there is provided an electric alignment device for birefringence grating, comprising: an alignment platform provided with at least two stripe electrodes, the at least two stripe electrodes are arranged parallel to each other so as to generate an electric field for aligning liquid crystal polymer in the birefringence grating.

According to another aspect of the invention, it is provided a method for aligning the birefringence grating by using the electric alignment device described above, wherein the birefringence grating comprises a concave grating and a substrate opposed to each other, and liquid crystal polymer filled between the concave grating and the substrate, the method comprises:

placing the birefringence grating onto the alignment platform; and feeding the at least two stripe electrode parallel to each other so as to generate a electric field on the alignment platform; and aligning the liquid crystal polymer by using the electric field.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solution of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at lease one. The terms "comprises," "comprising," "comprises," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may comprise an electrical connection, directly or indirectly. "On," "under," "right," "left" and the like are only used to indicate relative position relationships, and when the position of the object which is described is changed, the relative position relationship may be changed accordingly.

An embodiment according to the present invention, an alignment device for a birefringence grating comprises: an alignment platform on which an electric field (such as a horizontal electric field) for aligning the liquid crystal polymer in the birefringence grating is distributed. By the horizontal electric field generated on the alignment platform, the alignment direction of the liquid crystal polymer can be controlled. With this alignment device, the effect of the alignment can be improved, and the birefringence grating can be provided without any alignment layer, thus the cost is mostly reduced.

Figure 1A:
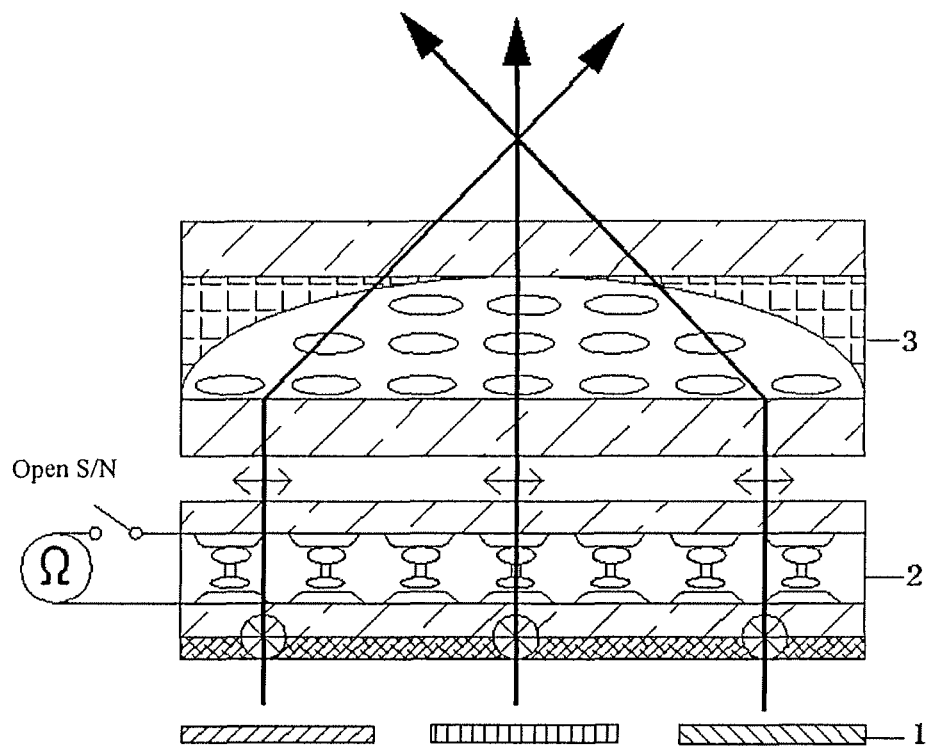
FIGS. 1a-1b schematically illustrates a configuration of an birefringence grating display device in prior art.
Figure 1B:
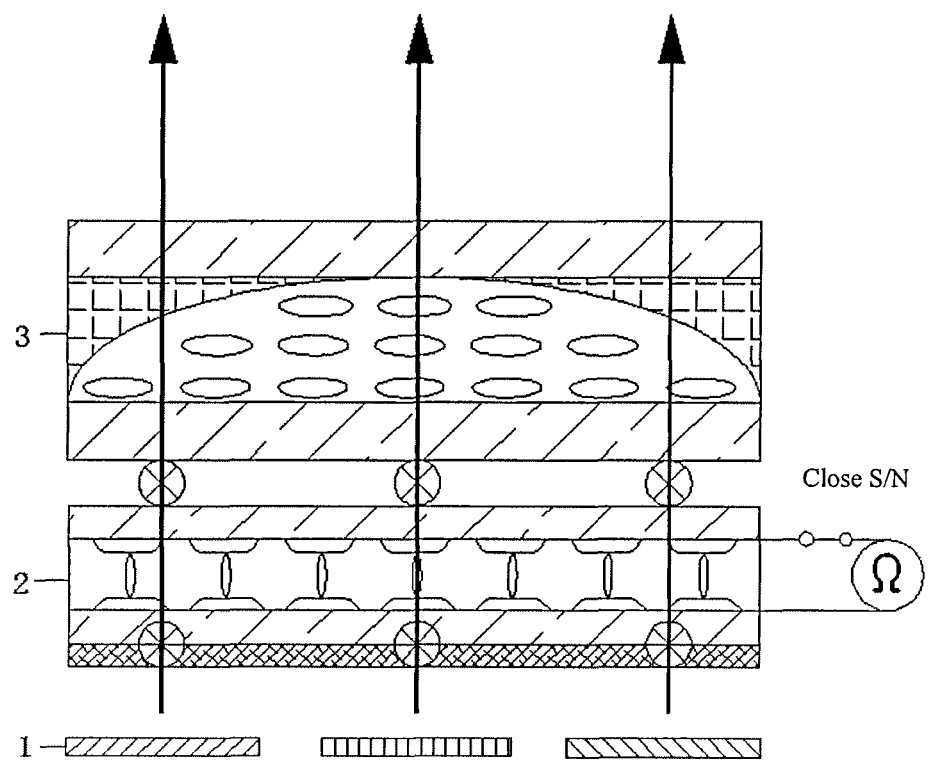
Figure 2A:
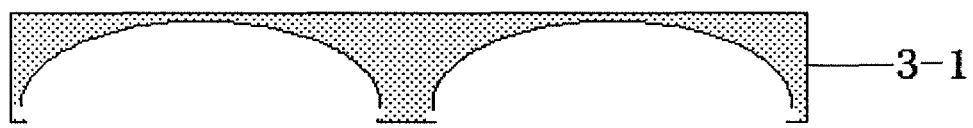
FIG. 2a schematically illustrates a configuration of a concave grating of the birefringence grating in prior art.
Figure 2B:
FIG. 2b schematically illustrates a configuration of a substrate of the birefringence grating in prior art.
Figure 2C:
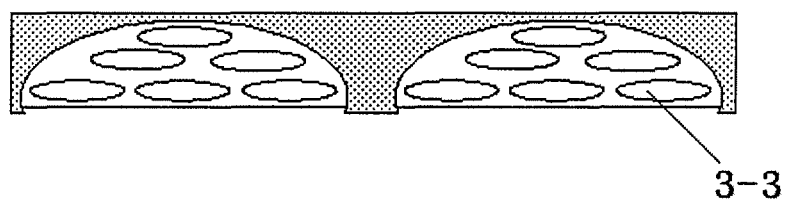
FIG. 2c schematically illustrates a configuration of the birefringence grating without the substrate in prior art.
Figure 3:
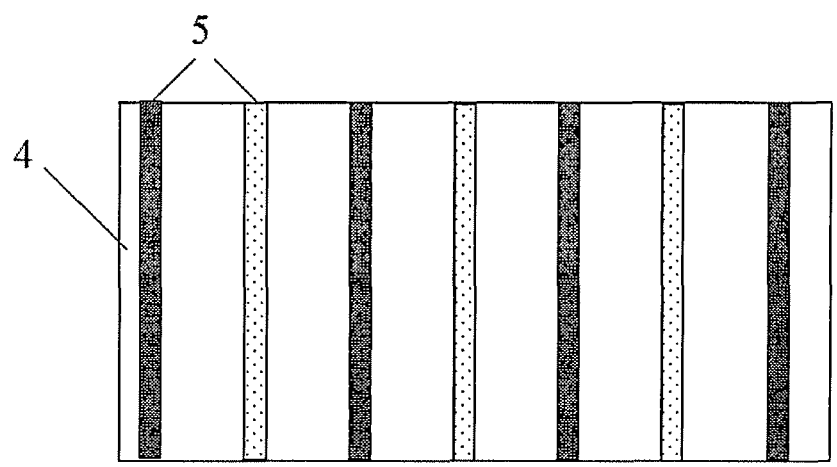
FIG. 3 illustrates a top view of an electric alignment device in accordance with an preferable embodiment of the invention.

As shown in FIG. 3, an electric alignment device according to a preferable embodiment of the present invention comprises an alignment platform 4 on which a plurality of stripe electrodes 5 parallel to each other are provided. Once the stripe electrodes 5 are supplied with electric power, an electric field used for aligning the liquid crystal polymer in the birefringence grating is generated on the alignment platform. The alignment platform 4 is made of insulating material, such as glass or plastic. The stripe electrodes are made of conductive material, such as metal. Preferably, the stripe electrodes are arranged opposed to the ridge of the concave grating 3-1, which will be described with more details.

Figure 4:
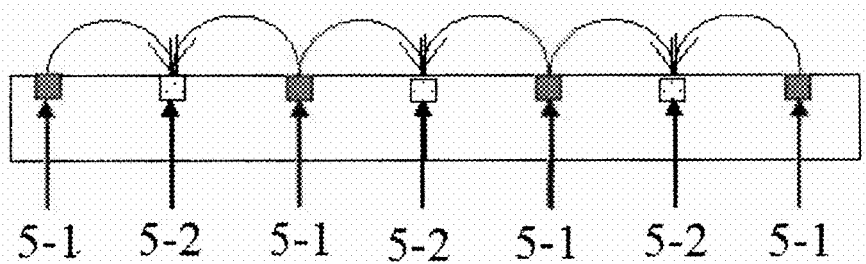
FIG. 4 schematically illustrates an electric field of an electric alignment device in accordance with an preferable embodiment of the invention.

As shown in FIG. 4, a plurality of stripe electrodes may comprises stripe electrodes 5-1 in odd columns and stripe electrodes 5-2 in even columns. In practical application of the electric alignment device, a voltage is applied to the stripe electrodes 5 via external power supply, so that all the stripe electrodes 5-1 in the odd columns have the same potential, all the stripe electrodes 5-2 in the even columns have the same potential. As a potential difference is formed between the stripe electrode 5-1 and the stripe electrode 5-2, an electric field is generated between the stripe electrode 5-1 and the stripe electrode 5-2, by which the liquid crystal molecules located in the electric field are sufficiently aligned. For example, a positive voltage is applied to the stripe electrodes 5-1 and a negative voltage is applied to the stripe electrodes 5-2. The direction of the electric field generated is shown as arc arrow in FIG. 4, which directs from the positive electrode toward the negative electrode. It should be noted that when the liquid crystal molecules is being aligned, the alignment direction required by the liquid crystal molecules is not the direction of an electric field formed just over the electrodes, but the direction of the electric field formed between the two adjacent electrodes. Namely, the direction of the electric field as required for alignment should be parallel to the alignment platform 4, or have a component parallel to the alignment platform 4 (such as horizontal component). Alternatively, the electric alignment device may further comprise a built-in power supply for supplying the voltage satisfying above requirement of alignment to the stripe electrodes 5 by itself.

Figure 5:
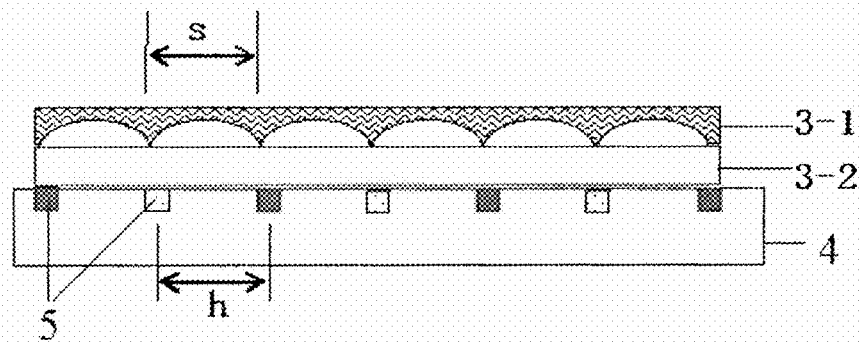
FIG. 5 schematically illustrates an electric alignment device equipped with the birefringence grating in accordance with an preferable embodiment of the invention.

The liquid crystal molecules in the birefringence grating are aligned under the effect of the horizontal component of the electric field formed in the electric alignment device. As mentioned before, in the electric alignment device according to the embodiment, the stripe electrodes 5 are preferably arranged opposed to the ridge of the concave grating 3-1, as shown in FIG. 5. Preferably, the distance "h" defined as the distance between the central lines of any two adjacent stripe electrodes is same as the grating pitch "s" of the birefringence grating to be arranged, such that after the birefringence grating is placed onto the alignment platform 4 of the electric alignment device (as shown in FIG. 5), the edges of electrodes 5 are opposed to the edge portions of concave grating ridges. By employing this configuration, the liquid crystal molecules with poor alignment are just located at the edge portion of the concave grating ridge in the birefringence grating, such that the adverse effect on the performance of the birefringence grating caused by the liquid crystal molecules with poor alignment can be minimized. Certainly, in other embodiments of the present invention, the distance "h" may not be equal to the grating pitch "s", namely, it is not necessary to arrange each of stripe electrodes 5 opposite to a grating ridge. For example, in an example, the grating pitch "s" is smaller than the distance "h" (s<h), more particularly, "h" is several times (such as 2, 3 or 4 times) of "s". In another example, merely two stripe electrodes may be arranged and opposite to the two grating ridges which locates at both ends of the concave grating, in this case, a voltage which is large enough should be applied to these two stripe electrodes, such that the electric field for aligning liquid crystal polymer can be generated on the alignment platform between two electrodes.

In the electric alignment device according to an embodiment of the present invention, although the width of each stripe electrodes should be as small as possible, but it is believed that the resistance is increased with the decrease in the width of the stripe electrodes, therefore the width of each stripe electrodes are preferably 2-10 μm. In addition, the voltage which is applied to the stripe electrodes 5 is dependent on: the distance between the stripe electrodes, the distance between the surface of the alignment platform 4 and the liquid crystal layer in the concave grating 3-1, the thickness of the liquid crystal layer, and the inherent dielectric anisotropy of the liquid crystal polymer. In an example, the voltage applied to the stripe electrodes is on the order of several hundred volts.

When the liquid crystal molecules are being aligned by the electric alignment device according to the embodiment of the present invention, the surface of the substrate 3-2 in opposite side of the concave grating 3-1 may be arranged in direct contact with the stripe electrodes of the electric alignment device (as shown in FIG. 5), or the lower surface of the concave grating ridges in the birefringence grating may be arranged in direct contact with the stripe electrodes of the electric alignment device. In practical application, which arrangement should be adopted is determined by practical requirements. Furthermore, in order to further improve the uniformity of alignment, the circumstance in which the birefringence grating is arranged on an uneven surface caused by the direct contact between the surface of the substrate 3-2 or the lower surface of the concave grating ridges in the concave grating 3-1 and the stripe electrodes 5 should be avoided. Therefore, the stripe electrodes 5 are preferably embedded into the alignment platform 4 so as to maintain the surface of the alignment platform flat. For example, the stripe electrodes 5 can be embedded into a portion of the alignment platform that is close to the surface (as shown in the FIGS. 4-5) and the embedding depth approximately equals to the height of the stripe electrode. Certainly, in other embodiments of the present invention, the embedding depth may also have other value.

Figure 6:
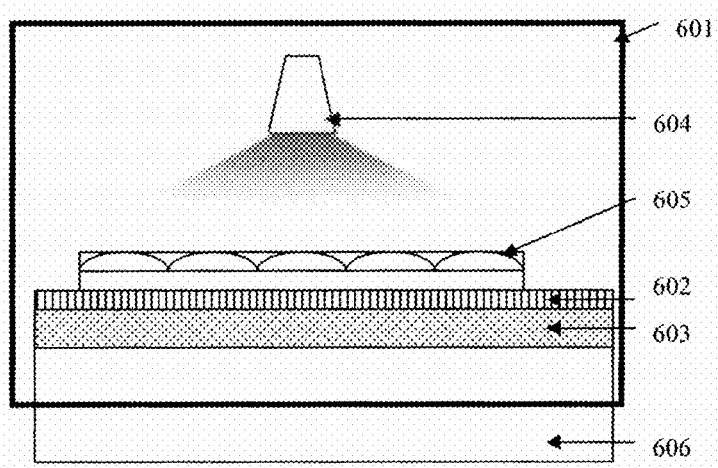
FIG. 6 schematically illustrates a configuration of an electric alignment device in accordance with another embodiment of the invention.

As shown in FIG. 6, the electric alignment device according to the embodiment of the present invention may further comprises an alignment chamber 601 that is an enclosed space; and an electrode plate 602 (that is the alignment platform provided with electrodes for alignment) arranged in the alignment chamber 601, an enclosed operating space is provided for the electrode plate 602 by the alignment chamber (the stripe electrodes are not shown in FIG. 6). The alignment device may further comprise a heating apparatus 603 and a liquid crystal curing apparatus 604. The heating apparatus 603 may be a heating platform to heat the electrode plate 602 and the birefringence grating 605, for example, by infrared ray or resistance wire. Alternatively, the heating apparatus 603 may also be used to heat the entire alignment chamber 601, so it can be fixed outside the alignment chamber 601 or above the electrode plate 602 in the alignment chamber 601. Preferably, the electric alignment device may further comprise a blower (not shown) used to maintain temperature of the entire chamber constant. The liquid crystal curing apparatus 604 is preferably arranged above the electrode plate 602 so as to cure the liquid crystal in the aligned birefringence grating, and more preferably, the apparatus 604 is ultraviolet (UV) curing apparatus. Preferably, the heating platform 603, alignment platform 602 and the birefringence grating 605 are arranged together over a supporting platform 606.

Alternatively, in another embodiment of the present invention, the electric alignment device is provided without the alignment chamber 601. The heating apparatus 603 is arranged under the electrode plate 602 for heating the electrode plate; meanwhile, the liquid crystal curing apparatus 604 is arranged above the electrode plate 602 for curing the liquid crystal in the aligned birefringence grating. Preferably, the liquid crystal curing apparatus is a UV curing apparatus. It should be noted that the heating apparatus 603 may also be arranged in any other position relative to the electrode plate 602, depending on design requirements, For example, the heating apparatus 603 is arranged above the electrode plate 602, or on one side of the electrode plate 602, etc; meanwhile the liquid crystal curing apparatus 604 may also be arranged in any other position relative to the electrode plate 602, for example, the curing apparatus 604 is arranged on one side of the electrode plate 602.

In addition, in the case of employing the electric alignment device according to the present invention for aligning the liquid crystal, it is possible to use the electric alignment device along with an alignment film, namely, a alignment film disposed on the substrate 3-1 of the birefringence grating may also be used to align the liquid crystal molecules together with the horizontal electric field for achieving better alignment effect.

Referring to FIG. 6, an alignment method using the electric alignment device according to above embodiment for aligning the birefringence grating 605 is provided in still another embodiment according to the present invention, in which the birefringence grating 605 comprises a concave grating and a substrate arranged opposite to each other, and liquid crystal polymer filled between the concave grating and the substrate. The method comprises:

placing the birefringence grating on the electrode plate 602; and feeding the stripe electrodes in the electrode plate 602 for generating an electric field on the electrode plate 602; and aligning the liquid crystal polymer in the birefringence grating 605 by using the electric field.

In an example, the method may further comprise: heating the birefringence grating by the heating apparatus 603 prior to electrify the stripe electrode 5.

In an example, the method may further comprise: curing the liquid crystal polymer by the liquid crystal curing apparatus 604 after aligning the liquid crystal polymer.

In addition, in the practical produce process, the alignment film together with the electric alignment device according to the embodiment of the present invention may be also adopted, since the alignment film is easier to be disposed on the upper surface of the birefringence grating substrate, and if the liquid crystal can be aligned by the alignment film together with the electric alignment device, the alignment effect of the liquid crystal in the birefringence grating will be better. For example, in an example, as the concave grating and the substrate are provided, the alignment layer can be disposed on the upper surface of the substrate, and then the substrate with the alignment layer is assembled with the concave grating. The later process is same as the method described above. Herein, detailed descriptions about the manufacturing method and the subsequent rubbing process of the alignment film are omitted.

An alignment process of the birefringence grating performed by the electric alignment device of the present invention is described below:

providing a concave grating and a substrate;

forming a birefringence grating 605 by assembling the concave grating with the substrate, and filling liquid crystal polymer in a cavity between the concave grating and the substrate; prior to the assembly, it is not necessary to form an alignment layer, so it is not necessary to operate alignment process; at this time, the liquid crystal molecules in the birefringence grating 605 are in the disordered arrangement;

heating the birefringence grating 605 to enhance the mobility of the liquid crystal in the birefringence grating;

placing the birefringence grating onto an electrode plate 602 of the electric alignment device shown in FIG. 6 and then feeding stripe electrodes provided by the electrode plate 602; because of the electric field, the liquid crystal in the birefringence grating begins to align.

feeding for a certain time, and simultaneously curing the liquid crystal in the birefringence grating 60 after the completion of the alignment of liquid crystals in the birefringence grating 605; after the completion of curing the liquid crystal, stopping feeding the stripe electrodes, and cooling the birefringence grating 605, finally, the birefringence grating with aligned and cured liquid crystal is obtained.

The electric alignment device according to the embodiment of the present invention is provided to align the liquid crystals in the birefringence grating by the electric field generated on the alignment platform. The better alignment effect can be achieved and the operation is simple, therefore the cost is mostly reduced.

What are described above is related to the illustrative embodiments of the disclosure only and not limitative to the scope of the disclosure; the scopes of the disclosure are defined by the accompanying claims.

What is claimed is:

1. An electric alignment device for a birefringence grating of a birefringence grating display device, wherein the birefringence grating display device comprises the birefringence grating, a switching device, and a display unit, wherein the birefringence grating comprises a concave grating and a substrate opposed to each other, and liquid crystal polymer filled between the concave grating and the substrate; and wherein the electric alignment device is configured to align the birefringence grating and comprises: an alignment platform provided with at least two stripe electrodes, the at least two stripe electrodes are arranged parallel to each other so as to generate an electric field for aligning the liquid crystal polymer in the birefringence grating, and the at least two stripe electrodes are embedded into the alignment platform to provide a flat surface on the alignment platform; and wherein lower surfaces of ridges of the concave gratings in the birefringence grating are arranged in direct contact with the at least two stripe electrodes of the electric alignment device.

2. The electric alignment device according to claim 1, wherein the electric field has a component of the electric field parallel to the alignment platform.

3. The electric alignment device according to claim 1, wherein a distance between central lines of two adjacent electrodes of the at least two stripe electrodes is equal to a grating pitch of the birefringence grating, and edges of the two adjacent electrodes of the at least two stripe electrodes are disposed to be opposed to edge portions of ridges of the concave grating; or the distance between the central lines of the two adjacent electrodes of the at least two stripe electrodes is multiple times of the grating pitch of the birefringence grating.

4. The electric alignment device according to claim 1, wherein the alignment platform is provided with a plurality of stripe electrodes, the plurality of stripe electrodes are arranged in such a manner that all stripe electrodes in odd columns have a same potential, all stripe electrodes in even columns have a same potential, and a potential difference exists between the stripe electrodes in the odd columns and the stripe electrodes in the even columns.

5. The electric alignment device according to claim 1, wherein a width of each of the at least two stripe electrodes is 2-10 μm.

6. The electric alignment device according to claim 1, wherein an embedded depth of the at least two stripe electrodes are embedded into the alignment platform is equal to a height of the at least two stripe electrodes.

7. The electric alignment device according to claim 1, further comprising a power supply apparatus for supplying a voltage to the at least two stripe electrodes.

8. The electric alignment device according to claim 1, further comprising an enclosed alignment chamber, the alignment platform is arranged in the alignment chamber.

9. The electric alignment device according to claim 8, further comprising a heating apparatus arranged outside the alignment chamber for heating the alignment chamber.

10. The electric alignment device according to claim 1, further comprising a heating apparatus arranged under the alignment platform for heating the alignment platform.

11. The electric alignment device according to claim 1, further comprising a liquid crystal curing apparatus arranged above the alignment platform.

12. An alignment method for a birefringence grating by using the electric alignment device according to claim 1, wherein the birefringence grating comprises a concave grating and a substrate opposed to each other, and liquid crystal polymer filled between the concave grating and the substrate, the method comprises:

placing the birefringence grating onto the alignment platform; and feeding the at least two stripe electrode parallel to each other so as to generate an electric field on the alignment platform;

aligning the liquid crystal polymer by using the electric field; and wherein the alignment method is performed before fixing the birefringence grating into the birefringence grating display device.

13. The alignment method according to claim 12, further comprising a step of heating the birefringence grating, prior to the feeding.

14. The alignment method according to claim 12, further comprising a step of curing the liquid crystal polymer, after aligning the liquid crystal polymer.

15. The alignment method according to claim 12, further comprising a step of forming an alignment layer on a surface of the substrate facing to the concave grating.

16. The alignment method according to claim 12, wherein the electric field has a component of electric field parallel to the alignment platform.

17. The alignment method according to claim 12, wherein a distance between central lines of two adjacent electrodes of the at least two stripe electrodes is greater than or equal to a grating pitch of the birefringence grating.

18. The alignment method according to claim 12, wherein the alignment platform is provided with a plurality of stripe electrodes, the plurality of stripe electrodes are arranged in such a manner that all stripe electrodes in odd columns have a same potential, all stripe electrodes in even columns have a same potential, and a potential difference exists between the stripe electrodes in the odd columns and the stripe electrodes in the even columns.

19. The alignment method according to claim 12, wherein the width of each of the at least two stripe electrodes is 2-10 μm.

20. The alignment method according to claim 12, wherein the at least two stripe electrodes are embedded into the alignment platform.

* * * * *